United States Patent Office 3,147,565
Patented Sept. 8, 1964

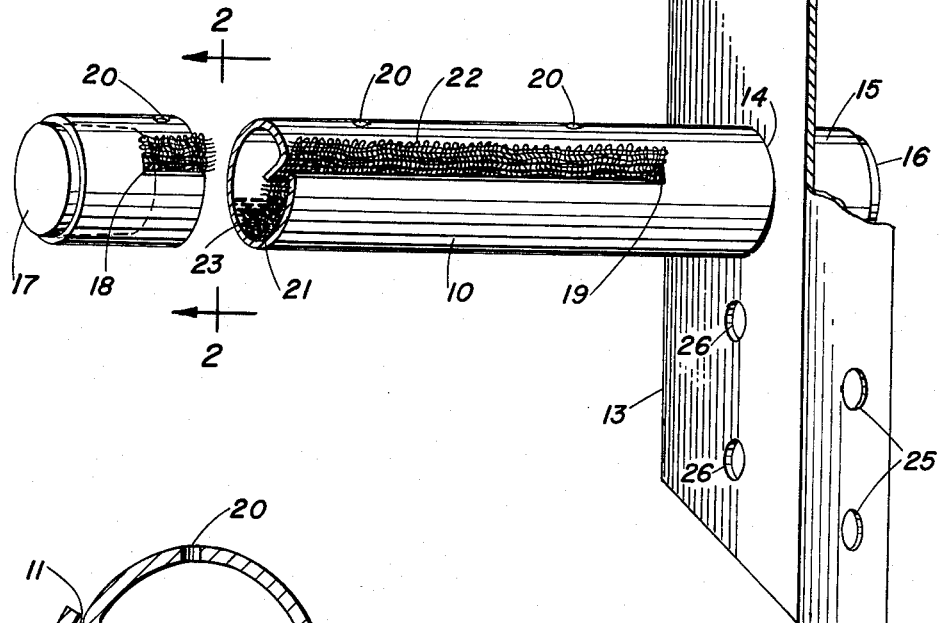
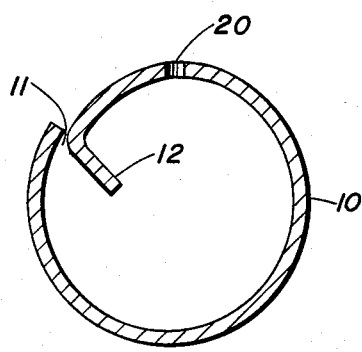

3,147,565
POISON DISPENSING BIRD PERCH
William A. Moore, Muscatine, Iowa, assignor to Rid-A-Bird, Inc., Muscatine, Iowa, a corporation of Iowa
Filed Feb. 5, 1960, Ser. No. 6,974
5 Claims. (Cl. 43—131)

This invention relates to roosts or a perch for birds, pigeons, and the like and in particular a roost having a wick extended longitudinally thereof with means for maintaining the wick saturated with a chemical, and exposed so that the feet of birds roosting on the perch kick up the chemical and the chemical causes the death of the birds.

The purpose of this invention is to provide means for applying a chemical to a perch or roost.

Various methods, and particularly the use of sprayed chemicals have been used on branches of trees, railings, cornices of buildings, and the like where birds make a practice of roosting. However, the chemicals are readily evaporated or washed away by rain, snow, and the like, and it is difficult to maintain sufficient of the chemical on branches of trees, railings, cornices and the like to eliminate birds. With this thought in mind this invention contemplates a perch or roost having a wick extended through a slot extended throughout the length of a tubular perch or the like wherein a chemical is fed to the exposed outer portion of the wick continuously regardless of the weather.

The object of this invention is, therefore, to provide a perch in which a chemically saturated wick is exposed to receive the feet of birds continuously.

Another object of the invention is to provide means for positioning a wick in a perch whereby the thin skin areas between the toes of the feet of birds contact a chemically saturated wick.

A further object of the invention is to provide a perch for applying a chemical to the feet of roosting birds, pigeons, and the like in which the chemical is picked up by the feet of the birds and soon causes the birds to die.

A still further object of the invention is to provide a perch for roosting birds, pigeons, and the like in which the perch is of a simple and economical construction.

With these and other objects and advantages in view the invention embodies an elongated tube having a longitudinally disposed slot in the upper surface and spaced from the center with means for applying a chemical to the wick positioned in the slot and with the tube supported by a bracket from the surface of a wall or the like.

Other features and advantages of the invention will appear from the following description taken in connection with the drawings, wherein:

FIGURE 1 is a perspective view showing the design and arrangement of the perch.

FIGURE 2 is a cross-section through the perch taken on line 2—2 of FIGURE 1 and with the parts shown on an enlarged scale.

Referring now to the drawings wherein like reference characters denote corresponding parts the perch of this invention includes a tube 10 having an elongated slot 11 extended substantially throughout the length thereof and having a reinforcing flange 12 extended into the interior, and a bracket 13 having an opening 14 for receiving the tube with one end 15 of the tube extended into the interior of the bracket and having a closure or plug 16 therein and with the opposite end of the tube provided with a plug or closure 17. The slot 11 extends from a point 18 spaced inwardly from the outer end of the tube to a point 19 spaced from the inner end of the tube. The upper surface of the tube is provided with openings 20 through which a chemical may be supplied to a wick 21 positioned in the slot 11 of the tube.

The wick 21 is positioned whereby an edge 22 extends outwardly from the slot and the opposite edge 23 is positioned on the lower side and inside of the tube whereby a chemical supplied to the tube through the openings 20 is absorbed by the edge 23 of the wick, saturating the wick and carrying the chemical to the outer edge 22 where it is positioned to contact the feet of birds and the like resting on the perch.

The bracket 13, which is of rectangular shape is provided with a continuous flange 24 and the flange is provided with bolt holes 25 by which the bracket may be mounted on the side of a building with the perch parallel to the building. The face of the bracket is also provided with bolt holes 26 by which the bracket may be secured to a wall surface with the perch extended outwardly from the wall.

The bracket 13 may be of any suitable design and the perch may be secured in the bracket by other suitable means.

Although it is preferred to use a tube one-half of an inch in diameter and thirty inches long it will be understood that the tube may be of any suitable size.

In the design shown the slot 11 is positioned at a point substantially forty-five degrees from a vertical or horizontal plane so that the toes of the feet of birds resting on the perch contact the edge 22 of a wick extended through the slot. The lower surface of the foot of a bird is provided with pads that are sufficient to withstand the action of a chemical and for this reason it is preferred to locate the edge 22 of the wick so that the pads of the feet will rest upon the upper surface of the tube whereas the toes of the feet will contact the wick.

The chemical applied to the wick is picked up by the toes of the feet of birds and, consequently, after a relatively short period of time the birds die. The chemical used may be a 10 percent concentration of "Endrin" and a petroleum hydrocarbon solvent, but there are other chemicals available on the market that might be used with the same results.

It will be understood that modifications, within the scope of the appended claims, may be made in the design and arrangement of the parts without departing from the spirit of the invention.

What is claimed is:

1. A bracket having openings therein for mounting elements, an elongated tube mounted in an opening of the bracket, removable plugs in opposite ends of the tube, said tube having an elongated slot in the upper portion and spaced from a vertical plane extended through the axis of the tube, filling openings in the upper surface of the tube, and a wick positioned in the slot of the tube and having an extended edge on the outside and spaced from a vertical plane extended through the axis of the tube, the inner edge of the wick being positioned to absorb a chemical in the tube whereby the chemical is carried by the wick to the outside of the tube.

2. In a bird perch, the combination which comprises an elongated tube having a longitudinally disposed slot in the upper surface and spaced from a vertical plane extended longitudinally through the tube, a wick positioned in said slot with one edge extended from the outer surface of the tube and with the opposite edge positioned in the lower portion of the tube, said tube having filling openings positioned in the upper surface thereof removable plugs providing closures positioned in opposite ends of the tube, a longitudinally disposed flange extended inwardly from the wall of the tube and positioned on one side of the longitudinally disposed slot for reinforcing said tube, a bracket having openings for fasteners therein, and means mounting the tube in the bracket whereby the tube is extended from the bracket.

3. A bracket having openings therein for mounting elements, an elongated tube mounted in an opening of the bracket, plugs in opposite ends of the tube, said tube having an elongated slot in the upper portion and spaced from a vertical plane extended through the axis of the tube, filling openings in the upper surface of the tube, and a wick positioned in the slot of the tube and having an extended edge on the outside and spaced from a vertical plane extended through the axis of the tube, the inner edge of the wick being positioned to absorb a chemical in the tube whereby the chemical is carried by the wick to the outside of the tube.

4. A bracket, an elongated tube operatively connected to said bracket, said tube having an elongated slot in the upper portion and spaced from a vertical plane extended through the axis of the tube, and a wick positioned in the slot of the tube and having an extended edge on the outside and spaced from a vertical plane extended through the axis of the tube, the inner edge of the wick being positioned to absorb a chemical in the tube whereby the chemical is carried by the wick to the outside of the tube.

5. A bracket having openings therein for mounting elements, an elongated tube mounted in an opening of the bracket and having closed opposite ends, said tube having an elongated slot in the upper portion and spaced from a vertical plane extended through the axis of the tube, filling openings in the upper surface of the tube, and a wick positioned in the slot of the tube and having an extended edge on the outside and spaced from a vertical plane extended through the axis of the tube, the inner edge of the wick being positioned to absorb a chemical in the tube whereby the chemical is carried by the wick to the outside of the tube.

References Cited in the file of this patent

UNITED STATES PATENTS

| | | |
|---|---|---|
| 727,454 | Royce | May 5, 1903 |
| 856,557 | Townsend | June 11, 1907 |
| 1,491,669 | Bulick | Apr. 22, 1924 |